United States Patent
Nantin et al.

(10) Patent No.: US 6,692,684 B1
(45) Date of Patent: Feb. 17, 2004

(54) METHOD AND APPARATUS FOR PRODUCING A STERILE PACKAGING CONTAINER

(75) Inventors: Hans Nantin, Trelleborg (SE); Lars Mårtensson, Veberöd (SE); Anders Andersson, Staffanstorp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/601,745

(22) PCT Filed: Mar. 22, 1999

(86) PCT No.: PCT/SE99/00446

§ 371 (c)(1),
(2), (4) Date: Aug. 7, 2000

(87) PCT Pub. No.: WO99/51497

PCT Pub. Date: Oct. 14, 1999

(30) Foreign Application Priority Data

Apr. 7, 1998 (SE) ................................. 9801217

(51) Int. Cl.⁷ ..................... B29C 49/64; A61L 2/16
(52) U.S. Cl. ................. 264/521; 264/525; 264/535; 425/524; 425/526; 425/538; 425/540
(58) Field of Search ........................... 264/521, 524, 264/525, 535, 515; 425/524, 526, 538, 540

(56) References Cited

U.S. PATENT DOCUMENTS

| | | | |
|---|---|---|---|
| 3,780,308 A | 12/1973 | Nablo | |
| 3,884,012 A | 5/1975 | Ernstsson et al. | |
| 3,911,642 A | 10/1975 | Ernstsson et al. | |
| 3,970,426 A | 7/1976 | Stark et al. | |
| 4,014,158 A | 3/1977 | Rausing | |
| 4,026,982 A | * 5/1977 | Dardaine et al. | ............ 264/525 |
| 4,099,914 A | 7/1978 | Gustafsson et al. | |
| 4,560,567 A | 12/1985 | Rausing | |
| 4,671,762 A | * 6/1987 | Weiler et al. | ................ 425/524 |
| 4,964,444 A | 10/1990 | Hanerus et al. | |
| 5,152,968 A | 10/1992 | Foti et al. | |
| 5,178,841 A | * 1/1993 | Vokins et al. | ................ 422/298 |
| 5,368,828 A | 11/1994 | Carlson | |
| 5,587,127 A | 12/1996 | Carlson | |
| 5,639,432 A | 6/1997 | Carlson | |

FOREIGN PATENT DOCUMENTS

| | | |
|---|---|---|
| EP | 0 481 361 | 4/1992 |
| WO | 96/18541 | 6/1996 |
| WO | 98/16259 | 4/1998 |

* cited by examiner

Primary Examiner—Suzanne E. McDowell
(74) Attorney, Agent, or Firm—Burns, Doane, Swecker & Mathis, L.L.P.

(57) ABSTRACT

The disclosure relates to a method and an apparatus for producing a sterile packaging container from a thermoplastic blank or preform which, during stepwise displacement between different processing stations (A–H), is subjected to a first heating to a temperature suitable for a subsequent sterilization with the aid of a chemical sterilization agent in gas form. A subsequent, additional heating stage imparts to the blank the desired moulding temperature, whereafter the blank, after displacement to a blow moulding station, is blow moulded to the desired configuration with the aid of mould halves (9) surrounding the blank. Hereafter, the blank is displaced to a filling station (E) in which it is filled with the desired contents in order thereafter finally to be sealed with the aid of a wafer (17) and discharged out of the apparatus according to the present invention.

20 Claims, 2 Drawing Sheets

METHOD AND APPARATUS FOR PRODUCING A STERILE PACKAGING CONTAINER

TECHNICAL FIELD

The present invention relates to a method of producing an interiorly sterile packaging container from a blank of thermoplastic material which is heated to moulding temperature and, with the aid of a pressure difference, is urged into abutment against an adjacent moulding surface. The present invention also relates to an apparatus for producing an interiorly sterile packaging container from a blank of thermoplastic material, the apparatus comprising a number of processing stations arranged in sequence.

BACKGROUND ART

A generally distributed type of packaging container for various types of drinks, for example water and soft drinks, is the blow moulded plastic bottle which consists of thermoplastic material and is normally produced from a blank, a so-called preform, or an extruded parison. A packaging container of this type may be manufactured rationally and at high speed. Moreover, the production method affords good hygiene, since the blow moulding operation requires such an elevated material temperature that the preform, in connection with the blowing operation, becomes more or less sterile. In order to maintain the interior freedom from bacteria also after the blowing operation and during the subsequent handling of the finished packaging container, it is however, necessary that the container be closed in bacteria-tight fashion immediately after manufacture. This may either take place temporarily as a preparation for later filling and sealing of the packaging container, or after a filling of the container with the desired contents undertaken immediately after the blow moulding operation.

In those cases when it is desirable to provide a guaranteed sterile package, for example for packaging previously sterilized contents to maintain long shelf life, a supplementary sterilization of the interior of the packaging container is however required, which may be put into effect with the aid of one of the known and accepted efficient methods which are employed for other types of packaging containers, for example sterilization using chemical agents (hydrogen peroxide) and/or thermal or radiation sterilization.

It is thus previously known in the art to sterilize different types of ready-made packages by means of, for example, chemical sterilization. The ready-formed packaging container is, in such instance, treated interiorly with the chemical sterilization agent in liquid, vapour or gas form. After having ensured that the whole of the interior of the packaging container comes into contact with the sterilization agent, the agent is once again evacuated with the aid of, for example, sterile hot air, in which operation both the air current and the elevated temperature ensure that residual quantities of sterilization agent in the finished packaging container will be at a minimum. However, sterilization of the finished package suffers from certain drawbacks since, on the one hand, a considerable quantity of sterilization agent is consumed because of the relatively large volume of the packaging container and, on the other hand, in certain types of packaging a containers it may be difficult to ensure that pockets such as inner corners and the like are sterilized adequately. The removal of the sterilization agent is correspondingly impeded by the volume and configuration of the packaging container and furthermore unavoidably entails a heating of the packaging container which, in for example blow moulded plastic bottles, may result in their thin-walled sections becoming weakened or deformed. Finally, the process is time-consuming and difficult to integrate rationally in the production and filling process.

There is thus a need in the art to realise a method which makes for the production of an interiorly sterile packaging container from a blank regardless of the configuration of the finished packaging container and without the risk of damage to such containers.

OBJECTS OF THE INVENTION—THE METHOD

One object of the present invention is therefore to realise a method of producing an interiorly sterile packaging container manufactured by blow moulding of a blank of thermoplastic material, the method making it possible, for example with known types of chemical sterilization agents, to integrally realise a sterilizing treatment during the production of a filled and sealed, ready-moulded packaging container.

A further object of the present invention is to realise a method of producing an interiorly sterile, blow-moulded packaging container, the method avoiding separate handling of the sterilized preform/packaging container before this is filled with the desired contents and finally sealed in a satisfactory manner from the hygienic and sterile points of view.

Yet a further object of the present invention is finally to realise a method of producing an interiorly sterile packaging container, the method not only ensuring optimum sterilization conditions, but also obviating the need for separate handling of the sterilized blank/packaging container between the actual instant of sterilization and the filling/sealing operations and thereby eliminating the majority of the above-outlined drawbacks from which prior art methods suffer.

SOLUTION

The above and other objects have been attained according to the present invention in that a method of the type described by way of introduction has been given the characterizing features that the blank is first heated to a temperature above the dew point of a gaseous sterilization agent which is thereafter brought into contact with the interior of the blank for a certain period of time, and that the blank is brought to an elevated temperature suitable for a moulding caused by the above-mentioned pressure difference.

Preferred embodiments of the method according to the present invention have further been given the characterizing features as set forth in appended subclaims 2 to 10.

By causing sterilization, using the method according to the present invention, to take place before reforming of the blank into finished packaging containers, it will be possible, because of the smaller volume of the blank and thereby the reduced interior surface area, to reduce the necessary quantity of sterilization agent and moreover independently of the configuration of the finished packaging container. The blank or the preform is normally of cylindrical configuration with rounded, closed end, and this form is well-suited for efficient and rapid sterilization. Moreover, sterilization of the blank instead of the finished packaging container entails a reduced quantity of sterilization agent per packaging container, which is also an advantage in view of any possible residual quantities in the finished, expanded packaging container.

Nor is the preform sensitive to heating, instead the heating operation is rather an advantage since it gives additional heat which facilitates the later heating to moulding temperature, with the result that the overall time for the process may be kept shorter than if sterilization had taken place separately after the moulding or forming operation.

There is further a need in the art to realise an apparatus for producing a sterile packaging container, the apparatus including means for making possible the rapid and reliable sterilization integrated with the production cycle proper. It is desirable that the apparatus be designed such that the risk of reinfection is minimal, at the same time as its design and construction are simple and make for a rapid and reliable production of blow-moulded, sterile, filled and sealed packaging containers.

OBJECTS OF THE INVENTION—THE APPARATUS

One object of the present invention is therefore to realise an apparatus for producing an interiorly sterile packaging container from a blank of thermoplastic material, the apparatus, in addition to the customary stations for forming, filling and sealing of packaging containers, also including means for a sterilization process integrated in the production cycle proper.

A further object of the present invention is to realise an apparatus which, despite its substantially conventional design and construction, includes means for sterile treatment of the packaging container blanks.

Yet a further object of the present invention is to realise an apparatus of the above-outlined type, the apparatus making for a continuous, protected handling of the packaging container blanks throughout the entire production cycle of filled and sealed sterile packaging containers.

Still a further object of the present invention is finally to realise an apparatus of the above-outlined type, the apparatus as a result of its design and construction obviating the need for separate handling of sterile packaging containers and/or blanks, so that the risk inherent in prior art apparatuses of reinfection is eliminated.

SOLUTION

The above and other objects have been attained according to the present invention in that an apparatus of the type described by way of introduction has been given the characterizing feature that it includes at least two stations for heating of the blank, and an interjacent station for sterilizing treatment of the blank.

Preferred embodiments of the apparatus according to the present invention have further been given the characterizing features as set forth in appended subclaims 12 to 20.

By realising, according to the present invention, an apparatus for producing interiorly sterile packaging containers by blow moulding, the apparatus not only including previously known types of sequentially arranged processing stations but also a station intended for sterilization of the blank placed interjacent two heating stations, it becomes possible to realise a compact and efficiently operating machine which ensures that the total production of filled and sealed, sterile packaging containers takes place without the packaging containers or blanks departing from the apparatus for the purpose of their production, which ensures an optimum result. The placing of the sterilization station between a first heating station for heating the blank to sterilization temperature and a second heating station for heating the blank to moulding or forming temperature reduces the overall size of the machine and increases its efficiency.

BRIEF DESCRIPTION OF THE ACCOMPANYING DRAWINGS

One preferred embodiment of both the method and the apparatus according to the present invention will now be described in greater detail hereinbelow, with particular reference to the accompanying, schematic Drawings, which show only those details indispensable to an understanding of the invention. In the accompanying Drawings.

DESCRIPTION OF PREFERRED EMBODIMENT

The method and the apparatus according to the present invention are intended to realise, as a part of a per se known production process, a rational and efficient sterilization of the interior of a blow moulded packaging container such that the packaging container will be suitable for the storage of long shelf life products. In different types of the blow moulding of packaging container, the point of departure is, in such instance, usually a blank 1 which may be of the type illustrated in FIG. 1, i.e. a so-called preform, or of, for example, an extruded parison or the like. In the present case, the blank 1 is of the preform type and is manufactured from thermoplastic multi-ply material, which, for example, may substantially consist of exterior and interior layers of polyester, between which a barrier layer of, for example, EVOH may be disposed, with surrounding adhesive layer of per se known type. Other types of blanks 1 are also naturally conceivable for employment, but for the production of sterile packages it is important that the blanks include some type of barrier layer. As is apparent from FIG. 1, the illustrated blank 1 has a bottom 2 which may be planar or cupola shaped, and an upper, flared or "rolled" neck portion 3. The blank 1 is relatively thin-walled and, from both the sterilization and the moulding points of view, it is an advantage if the blank has substantially the same wall thickness throughout its entire surface. As a result of the special flaring, the neck portion 3 will have a larger thickness but this is important in order to ensure that the neck portion has a well-defined form which is suitable for a tight fit of the blank in the apparatus according to the invention, as will be described in greater detail below.

Figures 1, 2:
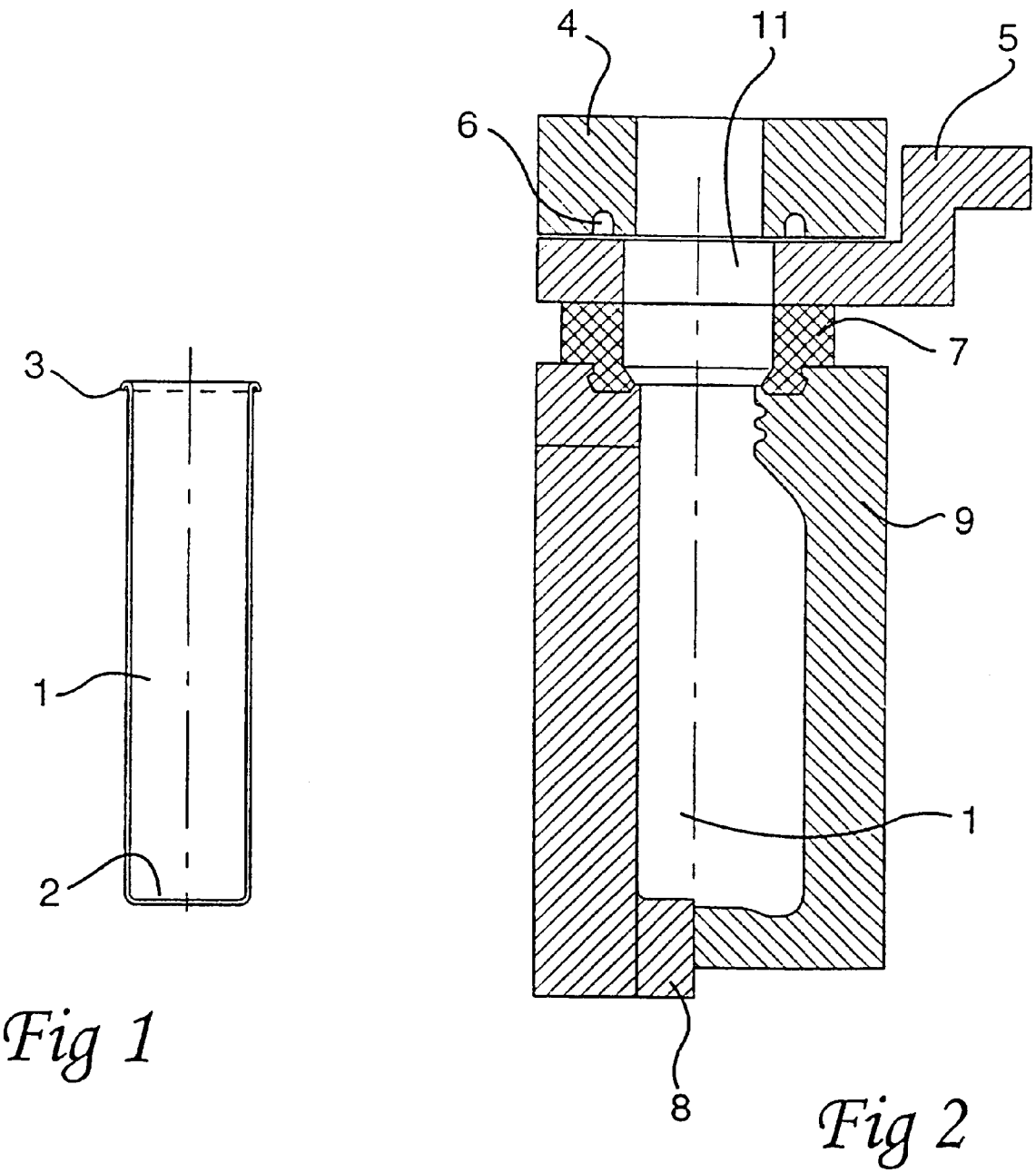
FIG. 1 is a section through a blank of the type which is intended to be used in the reduction of the method according to the present invention into practice, and utilizing the apparatus according to the present invention.
FIG. 2 shows, partly in section, a part of the apparatus according to the present invention, the left-hand section of the Figure showing the apparatus in a position on heating of the blank, while its right-hand section shows the apparatus after blow moulding of the blank.

FIG. 2 shows a section of the apparatus according to the present invention. The apparatus or the machine for producing sterile, blow moulded packaging containers comprises two main sections, namely a stator 4 and a rotor 5. As its name suggests, the rotor 5 is preferably circular and rotary (clockwise in FIG. 4), but notwithstanding this preferred embodiment, it is not excluded that the rotor 5 (and thereby also the stator 4) may also be of other configuration, e.g. a "rotor" in the form of a chain or conveyor with a number of plates and a rectilinear stator which is disposed along one or both of the rectilinear parts of the conveyor. It is apparent from FIGS. 2 and 4 how the rotor 5 and the stator 4 are disposed in relation to one another. A gap between the stator and the subjacent rotor makes for rotation of the rotor 5 without any impeding friction occurring, and in the gap there is also a number of ducts 6 for the supply of sterile air under excess pressure, whereby the space between the stator and the rotor will have a positive excess pressure which prevents bacteria from penetrating in from the outside. This will be explained in greater detail below. On its opposite (lower) side in relation to the stator 4, the rotor 5 also includes a number of gripping members 7 which are substantially annular and, at their lower end, include an inner groove for accommodating the neck portion 3 and exterior sealing surfaces for sealing abutment against both a hot jaw 8 and a mould half 9, as will be explained in greater detail below.

Figure 3:
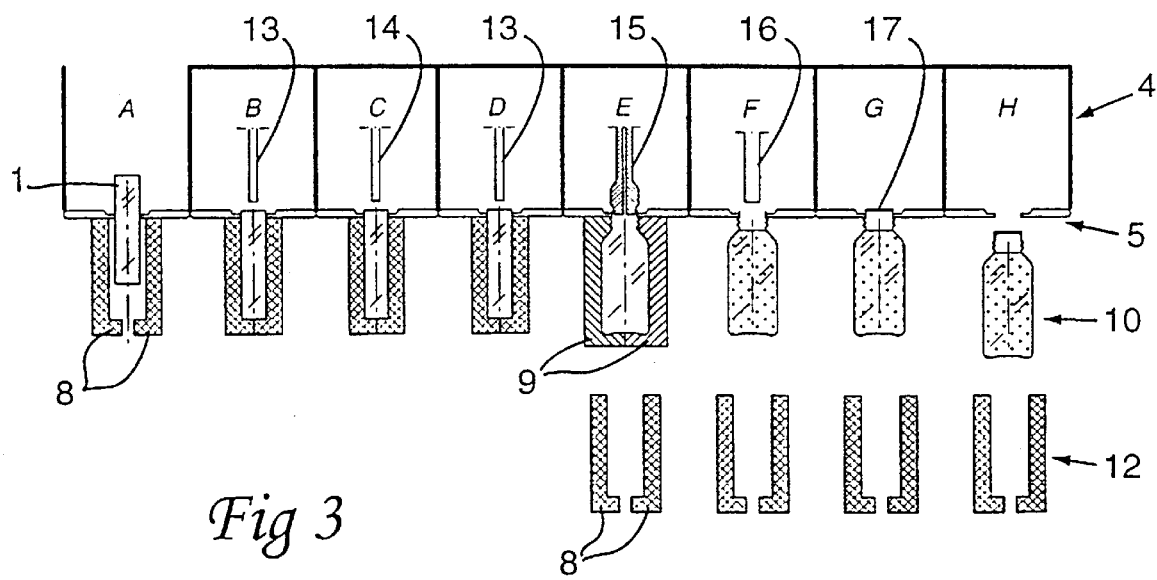
FIG. 3 shows, schematically and in section, how a number of processing stations in the apparatus according to the present invention are disposed in sequence after one another.
Figure 4:
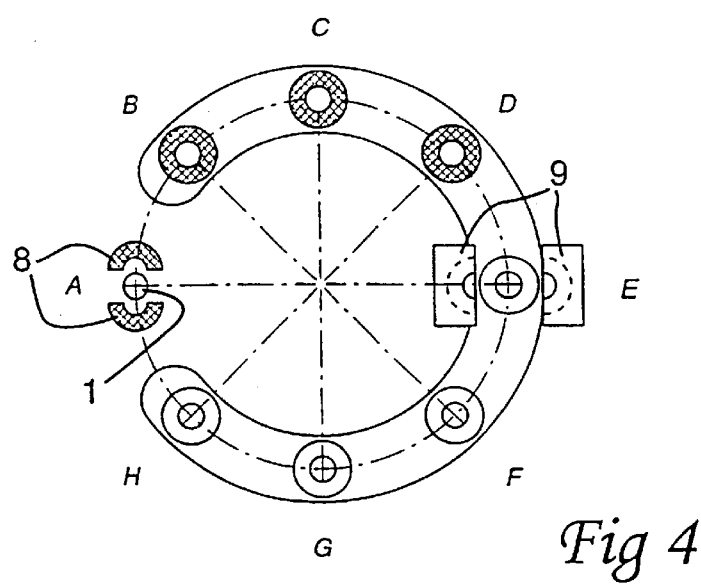
FIG. 4 is a schematic top plan view of the pressing station of FIG. 3.

In the schematic, expanded view of both the stator and the rotor which is shown in FIG. 3, it will be apparent how a number of different stations (A–H) are disposed in sequence along the stator, and also how the stepwise rotary rotor 5 is placed with the different gripping members beneath each respective station when the rotor is stationary. The different stations of the stator, which are also indicated in FIG. 4, are—counting from left to right in FIG. 3—an infeed station A, a first heating station B, a sterilization station C, a second heating station D, a blow moulding station E, a filling station F, a sealing station G and a discharge station H. The stations form chambers which are discrete from each other but are open downwards towards the rotor 5, a positive sterile air flow (as previously described) however ensuring that ambient air and bacteria cannot penetrate into the chambers of the different stations.

In the illustrated embodiment of the apparatus according to the present invention, the stepwise rotary rotor 5 includes eight uniformly distributed apertures 11 with gripping members 7 for the blanks/packaging containers 1, and, consequently, the eight stations of the stator 4 are correspondingly uniformly distributed at the same distance from the centre of the rotor as the gripping devices 7. Each stepwise rotation of the rotor 5 through one eighth of a revolution will thus displace a relevant blank/packaging container one step from one station to the next station. Immediately beneath the gripping devices 7 of the rotor 5 are disposed the hot jaws 8 which are connected to the rotor and rotate in step with it. The hot jaws 8 may, however, be displaced between an upper rotor plane 10 and a lower rotor plane 12, as will be explained in greater detail below. When the hot jaws 8 are located in the upper rotor plane 10, they can further be displaced between a closed and an open position. The open position, which is shown at the infeed station A, makes it possible to displace a blank 1 to the correct position between the hot jaws 8, while the closed position makes it possible to cause the hot jaws tightly to abut against the whole of the outside of the blank 1, as will be explained in greater detail below. The hot jaws 8 further include electric resistor elements (not shown) which make for heating of the hot jaws 8 to a suitable temperature, preferably approx. 100° C. When the hot jaws are displaced to the lower rotor plane 12, they are located a distance beneath the rotor 5, but are still synchronised with its rotation. The hot jaws 8 are located in the lower rotor plane 12 as of the blow moulding station E, in which the two mould halves 9 are placed. The mould halves 9 may, like the hot jaws 8, be displaced between an open and a closed position (shown in FIGS. 4 and 3, respectively). In the closed position, the mould halves 9 surround the blank 1 so that this may be blow moulded into full abutment against the inner contours of the mould halves 9. The mould halves 9 are, like the hot jaws 8, movable between the different positions by means of mechanical devices (not shown) such as levers, cams or various types of prime movers. The mould halves 9 also preferably include coolant channels, by means of which the working temperature of the mould halves 9 can be kept at a moderate level, preferably room temperature or slightly less (10–20° C.).

As will also be apparent from FIG. 3, there are provided in the stator 5 a number of devices for the supply of sterile air, sterilization agent, contents and the like. More precisely, the first heating station B includes a supply pipe 13 for hot air, the pipe extending substantially vertically down towards the apertures in the rotor 5 and the blank 1 held in the gripping member 7. The opposite end of the supply pipe 13 extends out through the wall of the station B and is in communication with a source (not shown) of heated, sterile compressed air. The equipment for this provision is of per se known type, e.g. an absolute filter and an electric heating device which is capable of heating the air to a temperature of preferably approx. 100° C. These arrangements are of known type and are therefore unlikely to need any detailed description in this context. A similar arrangement is provided in the second heating station D, where a further, identical supply pipe 13 is correspondingly supplied with sterile air heated to 100° C. or more.

In the sterilization station C located interjacent the two heating stations B and D, there is a supply pipe 14 for sterilization agent, this supply pipe, like the supply pipe 13 for hot air, extending substantially vertically through the station and being directed towards a blank 1 located in the gripping member 7. The opposite end of the supply pipe 14 extends out through the stator wall and is in communication with a source of suitable chemical sterilization agent, e.g. hydrogen peroxide in gas or vapour form, which is at a temperature of approx. 70° C. For $H_2O_2$, the temperature should in any event be above the dew point temperature, i.e. higher than approx. 60° C. Means for preparing and heating a suitable mixture of sterilization agent to the desired temperature are also well known within the pertinent field of technology, for which reason no further description is likely to be necessary in this context.

In the blow moulding station E, the stator includes a blow nozzle 15 which extends vertically through the station and is designed so that it can sealingly abut against the upper end or neck portion 3 of the blank 1 fixed in the gripping member 7. The nozzle 15 is thus movable in the vertical direction between an upper position a distance from the rotor 5 and a lower position in which it is urged against the neck portion 3 so that air aspirated via the nozzle 15 may create the desired excess pressure in the heated blank 1 in order to force the blank to assume the shape defined by the two mould halves 9. The nozzle 15 is connected in a conventional manner to a compressor for aspirated air.

In the filling station F, there is a vertically disposed filler pipe. On filling of certain product types (e.g. liquids with a manifest tendency to froth), the pipe may in a per se known manner be displaceable up and down so that, when a ready-formed packaging container is located in the filling station, it is displaceable to a lower filling position (not shown in FIG. 3) in which the mouth of the filler pipe 16 is located a distance above the bottom of the packaging container. During the filling operation, the filler pipe 16 is moved progressively upwards to the rest position illustrated in FIG. 3 a slight distance above the upper surface of the rotor 5.

In the sealing station G, the filled package is provided with a sealing wafer 17, which takes place with the aid of known and generally employed equipment for wafer sealing of packaging containers, e.g. bottles.

The discharge station H includes means (not shown) for releasing and transporting off the filled and sealed packaging containers. However, such means are well known in the art and are unlikely to need any detailed description here.

Fundamentally, the method according to the present invention is based on a blow moulding process of known type, i.e. heating and blow moulding of a blank, e.g. a preform, and subsequent filling and sealing of the thus produced packaging container. In earlier attempts to produce blow moulded packaging containers for sterile contents, the per se known production cycle has, however, been discontinued and a separate sterilization undertaken of the blow moulded packaging container after the blow moulding operation but before filling and sealing. As was mentioned above, it is also previously known in the art to rely exclusively on the moulding temperature of the plastic material for creating a packaging container free of bacteria. In accordance with the method according to the present invention, a satisfactory, preferably chemical sterilization is now integrated into the production cycle proper in such a manner that this may be put into effect at substantially unchanged speed and with unchanged reliability, at the same time as no separate handling of sterile, as yet unsealed packaging containers need take place.

In the production in accordance with the method according to the present invention of a sterile, filled and sealed blow moulded plastic package, a blank 1 of thermoplastic material, e.g. a polyester/EVOH combination is supplied to the rotor 5 in the infeed station A of the stator 4. The blank 1 is lowered by means of transport devices (not shown) down through the aperture in the rotor 5 and the gripping member 7 until the upper neck portion 3 of the blank 2 engages with the inner, lower section of the gripping member 7 and sealingly abuts thereagainst. During the insertion of the blank 1 in the rotor 5, the hot jaws 8 of the rotor are, in this position, in their open position illustrated in FIG. 3 so that the insertion of the blank 1 may take place without contact with the hot jaws 8. Once the blank 1 has been placed in the correct position, the hot jaws 8 are closed during simultaneous rotation of the rotor 5 one step (one eighth of a revolution), i.e. to the first heating station B. The hot jaws 8, which are heated to a temperature of approx. 100° C., will now, by abutment against the whole of the outside of the blank 1, progressively heat up the blank to a temperature above room temperature. Since the blank 1 substantially has uniform wall thickness, the heating will take place uniformly, which is a precondition for the subsequent satisfactory sterilization result.

When the blank 1 thus inserted in the rotor 5 has, as a result of the rotor's stepwise rotation, been brought to the illustrated position in the first heating station B, the means (not shown) for the supply of heated, sterile gas/air via the pipe 13 are activated, which ensures that the air passes the aperture in the gripping member 7 and reaches the interior of the blank 1. The air is at a temperature of preferably approx. 100° C., and as a result of the aspiration of the air into the blank 1, it will be ensured that the original room temperature air in the blank is replaced by heated air, for which reason the continued heating of the blank 1 takes place both from its inside and from its outside.

After having been located in the first heating station B for approx. 3 seconds, the blank 1 is thereafter displaced by the stepwise rotation of the rotor 5 to the sterilization station C, where the blank is placed immediately beneath the mouth of the supply pipe 14 for sterilization agent. The sterilization is undertaken as a gas phase sterilization with the aid of hydrogen peroxide ($H_2O_2$), which, when it flows out from the supply pipe 14, is at a temperature of approx. 70° C., or in any event at a temperature above the dew point temperature of 60° C. In order to avoid condensation of hydrogen peroxide on the inside of the blank 1, it is therefore important that the heating of the blank has now proceeded so far that its inner temperature is above 60° C. Ideally, the temperature should be between 60 and 65° C., but not exceed approx. 70° C., since this is the glazing temperature of the relevant material (polyester) below which the absorption by the material of sterilization agent is very limited. If the heating is continued so far that the material, when it is exposed to the hydrogen peroxide, is at a temperature above the glazing temperature, the capability of the material to absorb hydrogen peroxide increases dramatically, which leads to a severely increased risk of residual hydrogen peroxide remaining in the finished packaging container, since sterilization agent absorbed into the material cannot readily be removed by hot air and elevated temperature. Naturally, the surrounding mechanical parts will also be heated to a temperature above the dew point temperature, which also prevents condensation on these surfaces. In other types of plastic materials, the relevant temperatures are, of course, adapted suitably, but in general a maximum inner surface temperature may be given as approx. 80° C.

After the aspiration of sterilization agent into the blank 1 has continued during the placing of the blank in the sterilization station C, the blank is once again displaced stepwise to the subsequent, second heating station D, in which the blank is placed immediately beneath the mouth of the supply pipe 13 for sterile hot air. During the displacement between stations C and D, the temperature of the blank will be increased further as a result of thermal transfer from the hot jaws 8 surrounding the blank, the hot jaws being still held at a temperature of approx. 100° C. or slightly higher. When the blank has been placed in the correct position in station D, the supply of sterile hot air at a temperature of at least 100° C. commences, which not only entails that residual sterilization agent is heated and ventilated off, but also that the material temperature of the blank rises to a temperature suitable for blow moulding, i.e. a temperature in excess of 80° C., preferably between 90 and 110° C., depending upon the type of material in the blank in question. A temperature above 100° C. results in a packaging container possessing poorer mechanical strength, since, in such instance, there is no appreciable orientation of the plastic material in connection with the moulding or forming operation. Preferably, the temperature of the sterile air supplied via the supply pipe 13 is thus regulated such that only a limited temperature elevation takes place in relation to the temperature which the blank 1 already had by contact with the hot jaws 8 and the earlier supply of air. This temperature has also proved to remove residual sterilization agent in a satisfactory manner at reasonable air speed and air volume.

After the sterilization agent has thus been removed from the blank and the temperature of the blank has been raised to the sought-for temperature suitable for blow moulding, the rotor 5 is displaced a further step so that the now softened blank 1 is placed immediately beneath the blow nozzle 15 which, at the same time, is moved from its upper to its lower position. In its lower position or working position, the front end of the nozzle 15 will extend down into the gripping member 7 and sealingly abut against the neck portion 3 of the blank 1. During the transfer from station D to station E, both of the hot jaws 8 have also been moved to open position and removed and displaced from the upper rotor plane 10 to the lower rotor plane 12, which makes room for both of the mould halves 9 located in station E, so that these may be brought into sealing abutment against the outside of the gripping member 7, at the same time as they completely surround the blank 1. The mould cavity formed by the mould halves 9 is of greater volume than the blank 1 and, at the same time, displays a configuration which corresponds to the desired, external form of the finished packaging container. At the upper region of the mould halves 9, for example a portion of lesser diameter may be provided with a thread-forming wall surface, at the same time as the lower region of the mould halves 9 may be provided with an elevation so as to create an inward bight in the bottom of the bottle.

With the mould halves 9 in the position illustrated in FIG. 3 (also to the right in FIG. 2), a blow moulding tool (not shown) is activated and supplies blow moulding air at the desired pressure to the nozzle 15. The air is at a temperature of preferably approx. 20° C. and, as opposed to that which is the case in conventional blow moulding, the air is filtered before reaching the nozzle by means of an absolute filter, which ensures that bacteria or other contaminants cannot reach the inside of the blank 1 in connection with the blow moulding. In a conventional manner, the supplied air realises an expansion of the blank 1 heated to softening or plasticizing temperature so that the blank is urged against the mould cavity of the mould halves and obtains the thus determined configuration. Since the mould halves 9 are cooled to a temperature at or slightly below room temperature, the contact of the blank 1 with the mould halves 9 will automatically cause a cooling of the wall temperature of the blank and thereby an immediate stabilisation of the bottle in the desired form. Hereby, the mould halves 9 can once again be opened and removed from the blown bottle so that the bottle, by renewed rotation of the rotor 5, may be displaced a further step, namely to the filling station F.

When the blown bottle has reached the filling station F, the filler pipe 16 will be placed immediately above and in line with the centre axis of the bottle. Before filling is commenced, the filler pipe 16 (assuming that it is of the displaceable type) is moved in a per se known manner downwards through the neck of the bottle so that the mouth of the filler pipe 16 is located a slight distance above the bottom of the bottle when the supply of contents begins. The filling operation of metering type, i.e. the contents are supplied, for example, by means of a piston pump whose stroke volume corresponds to the desired contents volume. During the filling cycle, the filler pipe 16 is moved progressively upwards until it once again reaches the position illustrated in station F after completed filling.

A renewed displacement of the rotor 5 one step moves the filled packaging container to the sealing station G in which the neck portion 3 still retained by the gripping member 7 is provided with a liquid-tight seal wafer of suitable plastic material or a combination of, for example, aluminium foil and thermoplastic. Advancement and application of a previously sterilized wafer may take place using known technology, e.g. that illustrated in PCT application No. PCT/SE97/01831, to which reference is made for further information. After the rotor 5 has finally been displaced a further step, the now filled and sealed, sterile packaging container reaches the discharge station H in which the packaging container is preferably placed in some form of conveyor (not shown) which removes the neck portion 3 of the packaging container out of the gripping member 7 and displaces the packaging container from the apparatus according to the present invention so that it thereafter may, in a conventional manner, be provided with a screw cap and, for example, packed in a multipack for further transport to consumer outlets. The discharge of the packaging container from the rotor 5 may take place via a sluice system (not shown), or it is otherwise ensured—with the aid of the ducts 6 located in the stator 4 and the excess pressure of sterile air in the space between the stator 4 and the rotor 5—that bacteria or contaminants cannot penetrate in during displacement of the rotor 5 from the discharge station to the infeed station A. In the infeed station A, a new blank 1 is once again fed in, and the above-described, stepwise cycle is recommenced.

In the illustrated embodiment, the packaging containers Are produced with a volume of up to approx. 1 litre, which takes roughly 24 seconds from the introduction of the blank 1 into the infeed station A until the discharge of the sterilized, filled and sealed packaging container in the discharge station H. This gives a treatment time of approx. 2.5 seconds in each station, which is sufficient for each one of the described operation phases. It will readily be perceived that the integration of the sterilization operation in the heating cycle involves a rationalisation which not only makes the production simpler and more reliable but also reduces the size of the apparatus in purely physical terms, which in practice implies several advantages. It will also be apparent from the forgoing disclosures how the method according to the present invention makes it possible, without disruption, for example for intermediate handling or transport, to sterilize, fill and seal a packaging container, which affords extremely good preconditions for a high standard of hygiene ensuring that the packaging containers and their packed contents may actually be kept sterile. The integrated sterilization process is moreover an energy saving and has in practice proved to reduce the quantity of sterilization agent employed,'since the volume and wall surface area of the preform are considerably smaller at the instant of sterilization than the total volume and wall surface area of the finished packaging container. The risk of residual quantities of sterilization agent in the packaging container is hereby also reduced.

The described, preferred embodiment of the method and the apparatus according to the present invention may naturally be varied in different ways, for example in that the chemical sterilization agent is supplemented with some type of thermal or radiation sterilization, e.g. with the aid of infrared heating or ultraviolet light. The illustrated, blown plastic bottle is assumed to be rotation-symmetrical, but the arrangement according to the present invention naturally also makes its possible to blow mould other types of plastic bottles, for example of square cross section, or plastic bottles provided with integral, projecting handles. This type of more complex packaging container configuration has no negative effect on the sterilization result in the method according to the present invention, since the sterilization in any event takes place before the blow moulding operation, while the blank displays its cylindrical, uncomplicated configuration.

It should be observed that, while the production has been described as a sequence of different procedural steps, certain of the steps may of course be more or less integrated or merge together, which, for example is the case with the heating stages in stations B and D, as well as the station C, since, throughout all of this time (i.e. from the infeed station A up to and including the second heating station D), the blank 1 is in continuous contact with the hot jaws 8. However, the supply of heat is calculated such that the desired temperature limits for the blank are maintained, when this is located in the sterilization station C.

What is claimed is:

1. A method of producing an interiorly sterile packaging container from a blank of thermoplastic material which is heated to moulding temperature and, with the aid of a pressure difference, is urged into abutment against an adjacent moulding surface, characterized in that the blank (1) is first heated to a temperature above the dew point of a gaseous sterilization agent which is thereafter brought into contact with the interior of the blank for a certain period of time; and that the blank is brought to an elevated temperature suitable for a moulding caused by said pressure difference.

2. The method as claimed in claim 1, characterized in that the blank (1) is heated from the outside by means of contact heating device (8) which surrounds the blank throughout the entire heating and sterilization cycle.

3. The method as claimed in claim 2, characterized in that the inside of the blank (1) both before and after the sterilization phase, is brought into contact with heated gas.

4. The method as claimed in claim 3, characterized in that the gas is sterile air.

5. The method as claimed in claim 3, characterized in that the temperature of the gas is higher than the dew point temperature of the gaseous sterilization agent.

6. The method as claimed in claim 1, characterized in that the gaseous sterilization agent is hydrogen peroxide.

7. The method as claimed in claim 6, characterized in that the temperature of the sterilization agent is higher than its dew point temperature.

8. The method as claimed in claim 1, characterized in that the blank, prior to the sterilization phase, is heated to an inner surface temperature of 60–80° C.

9. The method as claimed in claim 1, characterized in that the blank (1) is, after the sterilization phase, heated to a temperature of 90–110° C.

10. The method as claimed in claim 1, characterized in that it comprises in sequence:
    a pre-heating stage in which the blank is heated to an inner surface temperature which exceeds the dew point temperature of the relevant, gaseous sterilization agent but is less than the glazing temperature of the thermoplastic material,
    a sterilization stage in which the sterilization agent is introduced in the gas phase into the blank,
    a final heating stage in which the blank is heated to a temperature exceeding the glazing temperature of the blank and sterile hot air is introduced into the blank for removing sterilization agent, and
    a blow moulding stage in which sterile air at excess pressure is aspirated into the blank so that this is expanded and brought into abutment with the surrounding mould whose temperature is kept lower than the glazing temperature of the thermoplastic material.

11. An apparatus for producing an interiorly sterile packaging container from a blank (1) of thermoplastic material, said apparatus comprising a number of sequentially arranged processing stations (A–H), characterized in that it includes at least two stations (B, D) for heating the blank (1), and also an interjacent station (C) for sterilizing treatment of the blank.

12. The apparatus as claimed in claim 11, characterized in that the apparatus includes a stator (4) and a rotor (5), said stator comprising:
    a station (A) for infeed of a blank,
    a station (B) for a first heating of the blank,
    a station (C) for sterilization treatment of the blank,
    a station (D) for a second heating of the blank,
    a station (E) for reforming the blank into a packaging container,
    a station (F) for filling the packaging container with contents
    a station (G) for sealing the packaging container, and
    a station (H) for discharging the filled and sealed packaging container.

13. The apparatus as claimed in claim 12, characterized in that the heating stations (B, D) include supply pipes (13) for hot air.

14. The apparatus as claimed in claim 12, characterized in that the sterilization station (C) includes a supply pipe (14) for gaseous, chemical sterilization agent.

15. The apparatus as claimed in claim 12, characterized in that the rotor (5) has hot jaws (8) for heating the blank (1), said jaws being in contact with the outside of the blank in both the heating stations (B, D) and the interjacent sterilization station (C).

16. The apparatus as claimed in claim 12, characterized in that the rotor (5) has mould halves (9) which are disposed to surround the blank (1) when same is located in the moulding station (E).

17. The apparatus as claimed in claim 16, characterized in that the mould halves (9) include cooling devices.

18. The apparatus as claimed in claim 12, characterized in that the hot jaws (8) are movable between an upper and a lower rotor plane (10, 12, respectively).

19. The apparatus as claimed in claim 11, characterized in that the rotor (5) has gripping members (7) for mechanical, tight connection to the tubular end of the blank (1).

20. The apparatus as claimed in claim 19, characterized in that the distribution between the gripping members (7) of the rotor (5) corresponds to the distribution between the stations (A–H) of the stator (4), the rotor being disposed to be rotated stepwise one distribution step at a time.

* * * * *